UNITED STATES PATENT OFFICE.

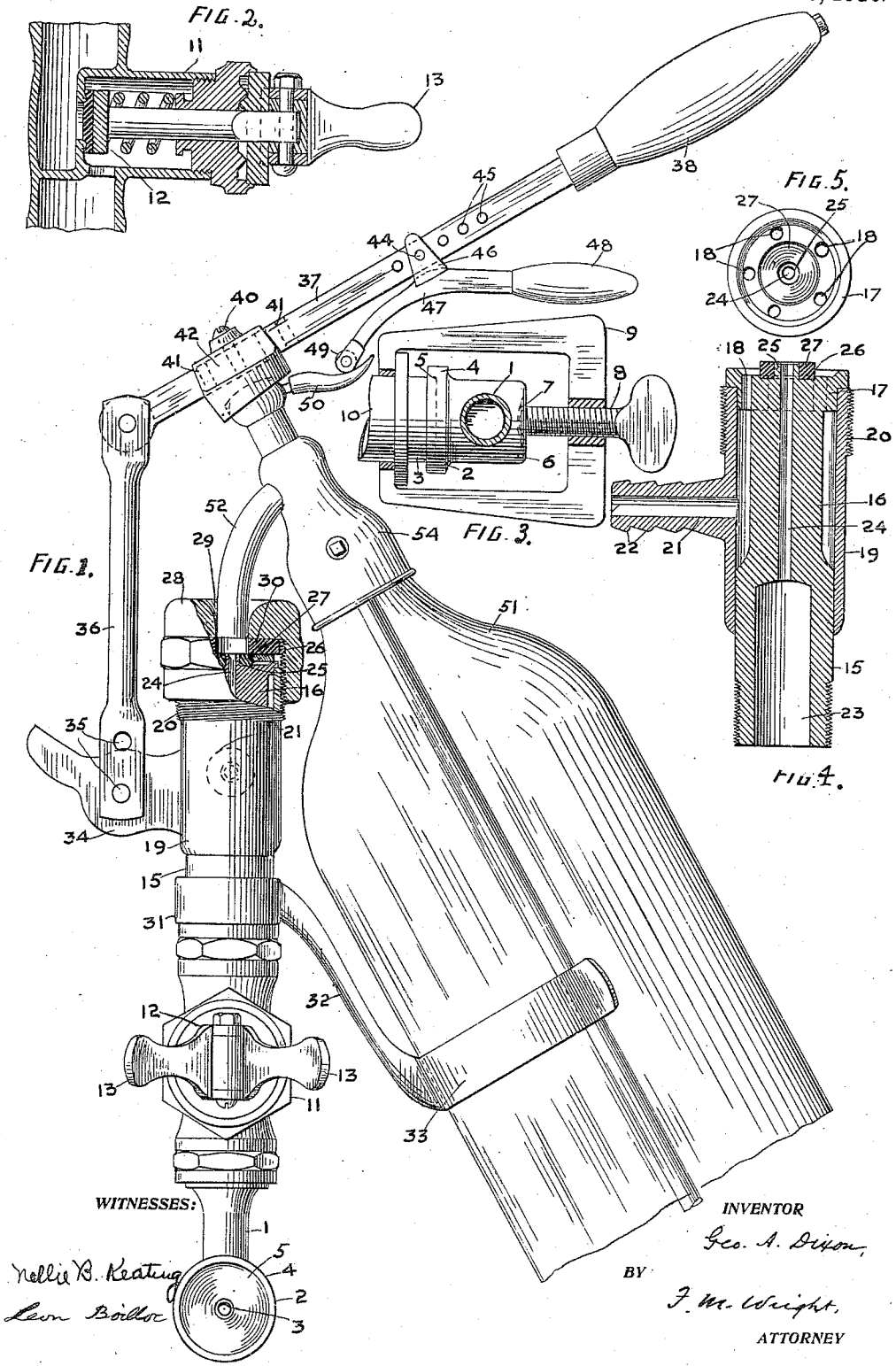
G. A. DIXON.
SIPHON FILLER.
APPLICATION FILED APR. 7, 1910.
973,264.
Patented Oct. 18, 1910.

GEORGE A. DIXON, OF SAN FRANCISCO, CALIFORNIA.

SIPHON-FILLER.

973,264.	Specification of Letters Patent.	Patented Oct. 18, 1910.

Application filed April 7, 1910. Serial No. 554,062.

*To all whom it may concern:*

Be it known that I, GEORGE A. DIXON, a citizen of Canada, residing at San Francisco, in the county of San Francisco and State of California, have invented new and useful Improvements in Siphon-Fillers, of which the following is a specification.

This invention relates to an improved apparatus for filling siphon bottles, and the object of the invention is to provide such an apparatus by which a siphon bottle can be quickly and conveniently filled through its spout.

In the accompanying drawing, Figure 1 is a broken side view of my improved filling device, showing also part of a siphon bottle being filled thereby; Fig. 2 is a vertical section through a supply valve; Fig. 3 is a horizontal section showing the device clamped to a tube or outlet; Fig. 4 is a vertical section through a portion of the device; Fig. 5 is a top plan view of the part shown in Fig. 4.

Referring to the drawing, 1 indicates a conduit, formed at the bottom with a lateral extension 2, so that a conduit 3 extends therein at right angles to the direction of the conduit 1. Said extension terminates in a rim 4 and a cavity within said rim and around said conduit 3 to receive a washer 5. Opposite to said extension 2 is an extension 6, which is formed with a recess 7 adapted to receive the point of a screw 8 which is screwed through the center of a yoke 9, the ends of which yoke extend inwardly, thereby permitting the conduit 1 to be tightly clamped, by means of said screw, to the spigot 10 of a filling tank or reservoir. The liquid can therefore pass upward from said reservoir through the conduit 1. Said conduit is connected at its upper end to a valve casing 11, in which is a valve 12 which is opened by pressing together two spring operated handles 13. Upon releasing said handles the springs immediately close said valve. The upper end of said valve casing is internally threaded, and thereinto screws the threaded end of a tube 15, the upper portion 16 of which is reduced in diameter, except at the extreme upper end where it is formed with a flange 17. Vertical apertures 18 are formed through said flange and communicate with the space around the reduced upper portion 16. Around the tube 15 is passed a sleeve 19, which is externally threaded at its upper end 20, and which sleeve is formed with a laterally extending tube 21, corrugated on the outside as shown at 22, to enable a flexible pipe to be attached thereto. The lower portion of said tube is formed with a passage 23 of comparatively large diameter, but the upper end is formed with a passage 24 communicating therewith of much smaller diameter, and said upper end is formed with a central boss 25, through which said passage passes centrally, and is also formed with a seat 26 around said boss to receive a rubber washer 27. To retain the sleeve 19 upon the tube 15, there is provided an internally threaded cap 28, which is screwed upon the upper end of the sleeve 19, and is centrally apertured, as shown at 29, the wall of the cap surrounding said aperture being rounded and tapered inward. In said cap is a rubber washer 30 which fits tightly around the rubber washer 27.

Surrounding the lower end of the tube 15, and resting upon the upper end of the valve casing 11, is a collar 31, from which depends an arm 32 having at its ends an approximately semi-circular seat 33, on which can rest the body of a siphon bottle. From the sleeve 19 extends laterally an apertured lug 34, to which is selectively pivoted by either of two pairs of pivot holes 35 therein, the lower forked end of a standard 36, to the upper end of which is fulcrumed a lever 37 having a handle 38. Said lever has adjustably secured thereon, by means of a screw 40 in one of a series of holes 41, a block 42, which can slide upon the lever to cause the screw 40, screwed through a boss in said block, to register with any one of said holes 41. The under side of said block is concaved to adapt it to fit upon the extreme top of a siphon head. Also adjustably secured to said handle by means of a pivot 44, passed through any one of a series of holes 45 through said handle, and also through holes formed in a saddle 46, is a lever 47 formed in one piece with said saddle, having at one end a handle 48 and in its forked other end a roller 49 adapted to engage the operating handle 50 of the siphon head. Such being the construction of the apparatus the following is the mode of operation. The siphon bottle 51 is placed so that its body rests upon the semi-circular seat 33, and the end of the spout 52 is inserted through the apertured cap 28 and rests against the rubber washer 27. In this position alone, without the weight of the lever 37, such a tight joint is made between the end of the spout and the upper end of the tube 15, that, if the valve handles be compressed to open the valve, and liquid under pressure is permitted to ascend through the several conduits in succession, the liquid will pass up into the spout without leaking at the end thereof. The slidable block 42 is adjusted for the size of the siphon bottle, so as to contact with the top of the siphon head and the lever 47 is also adjusted so that the roller 49 bears upon said operating handle 50.

The siphon bottle is provided with a sniff 54 to permit of the escape of confined air and free gas, and this sniff may be unscrewed so as to permit the air to escape just as rapidly as the liquid enters, and, when so properly adjusted, the sniff does not have to be adjusted when filling the bottle but is only screwed tight when the bottle is completely filled. When the parts are in this position, the operator depresses the lever 37 by means of the handle 38, thus maintaining the end of the spout firmly in contact with the rubber washer 27, and at the same time raises the handle 48, which operates the siphon valve. The passage into the siphon bottle is now open. He then presses together the valve handles 13, and opens the valve 12. Immediately the liquid under pressure rushes up through the vertical conduits and into the spout and enters the siphon bottle. The air escapes at the same rate as the liquid enters. When the bottle is filled the operator releases the handles 13, closing the valve 12, and also releases the handle 48, which closes the siphon bottle. Any liquid, which remains in the spout when the siphon bottle is withdrawn discharges through the apertures 18 and the annular conduit within the sleeve 19 to the tube 27 and by a hose, not shown, to a convenient place of discharge.

The sleeve 19 can be turned upon its axis to any position so that the lever 37 can extend in any direction, and when the apertured cap 28 is screwed down upon the upper end of the sleeve 19, it clamps the same in position against turning on its axis. Also the collar 31 carrying the seat 33 can be turned in any direction.

A great advantage of this apparatus is that it can be attached directly to the tank or reservoir containing the filling liquid. Requiring no other support, it is therefore much more compact in form than prior forms of fillers.

I claim:—

1. The combination of a tube, a sleeve around said tube, an apertured cap over the upper end of the tube and connected to said sleeve, said sleeve being rotatable about the tube until clamped by said cap, a standard secured at its lower end to said sleeve, a lever pivoted at the upper end of said standard, and means carried by said lever and adapted to engage the top of a siphon head to depress the end of its spout through said apertured cap, substantially as described.

2. The combination of a tube, a sleeve around said tube, an apertured cap over the upper end of the tube and connected to said sleeve, said sleeve being rotatable about the tube until clamped by said cap, a collar around said tube and rotatable thereon, a device depending from said collar and adapted to support a siphon body, a standard secured at its lower end to said sleeve, a lever pivoted at the upper end of said standard, and means carried by said lever and adapted to engage the top of a siphon head to depress the end of its spout through said apertured cap, substantially as described.

3. The combination of a conduit, the upper end of which is adapted to be engaged by a spout of a siphon bottle, a normally closed spring-pressed valve in said conduit, a handle for operating said valve, means for supporting the body of the siphon bottle upon said conduit, a standard supported by the conduit, a lever fulcrumed on said standard, a device carried by said lever adapted to engage the head of a siphon bottle so supported, and a second lever fulcrumed, upon the first named lever and adapted to engage the siphon valve handle, both of said levers adapted to be grasped by the hand of the operator, substantially as described.

4. The combination of a conduit, the upper end of which is adapted to be engaged by a spout of a siphon bottle, a normally closed spring-pressed valve in said conduit, a handle for operating said valve, means for supporting the body of the siphon bottle upon said conduit, a standard adjustably supported by the conduit, a lever fulcrumed on said standard, a device adjustably carried by said lever adapted to engage the head of a siphon bottle so supported, and a second lever adjustably fulcrumed upon the first named lever and adapted to engage the siphon valve handle, both of said levers adapted to be grasped by the hand of the operator, substantially as described.

In testimony whereof I have hereunto set my hand in the presence of two subscribing witnesses.

GEORGE A. DIXON.

Witnesses:
FRANCIS M. WRIGHT,
NELLIE B. KEATING.